US012332078B2

(12) United States Patent
Dake et al.

(10) Patent No.: US 12,332,078 B2
(45) Date of Patent: Jun. 17, 2025

(54) MAP GENERATION METHOD AND MAP GENERATION DEVICE

(71) Applicant: Yanmar Power Technology Co., Ltd., Osaka (JP)

(72) Inventors: Yuichiro Dake, Osaka (JP); Isao Wakabayashi, Osaka (JP); Naohiro Hara, Osaka (JP); Tomoya Fukukawa, Osaka (JP); Toshiyuki Yokoue, Osaka (JP); Satoshi Minamiyama, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 221 days.

(21) Appl. No.: 17/910,942

(22) PCT Filed: Mar. 4, 2021

(86) PCT No.: PCT/JP2021/008358
§ 371 (c)(1),
(2) Date: Sep. 12, 2022

(87) PCT Pub. No.: WO2021/182270
PCT Pub. Date: Sep. 16, 2021

(65) Prior Publication Data
US 2023/0144543 A1 May 11, 2023

(30) Foreign Application Priority Data
Mar. 12, 2020 (JP) ................. 2020-042889

(51) Int. Cl.
*G01C 21/00* (2006.01)
(52) U.S. Cl.
CPC ..... *G01C 21/3848* (2020.08); *G01C 21/3807* (2020.08); *G01C 21/3852* (2020.08); *G01C 21/3881* (2020.08)

(58) Field of Classification Search
CPC ............ G01C 21/3848; G01C 21/3852; G01C 21/3881; G01C 21/3807
See application file for complete search history.

(56) References Cited

U.S. PATENT DOCUMENTS 10,429,845 B2 * 10/2019 Arbuckle ............... B63H 21/21
10,684,131 B2 * 6/2020 Rochan Meganathan ...................
G01S 7/41
(Continued)

FOREIGN PATENT DOCUMENTS

JP 2006098094 A 4/2006
JP 2007528510 A 10/2007
(Continued)

OTHER PUBLICATIONS

Japanese Office Action dated Jun. 27, 2023 issued for JP Application No. 2020042889.
(Continued)

*Primary Examiner* — Anil K Bhargava
(74) *Attorney, Agent, or Firm* — NORTON ROSE FULBRIGHT US LLP

(57) ABSTRACT

The present disclosure includes a radar configured to detect surrounding objects and terrain, and a LIDAR configured to detect the surrounding objects and terrain using a narrower detection range and a higher resolution than the radar. The disclosure also includes a first map, such as a wide-area map, generated based on information about the surrounding as detected by the radar, a second map, such as a high-resolution map, based on information about the surroundings as detected by the LIDAR, and a composite map that has the grid width of the first map and the grid width of the second map.

12 Claims, 12 Drawing Sheets

(56) References Cited

U.S. PATENT DOCUMENTS

| | | | |
|---|---|---|---|
| 11,167,833 B2* | 11/2021 | Akuzawa | G01C 21/203 |
| 11,480,435 B2* | 10/2022 | Li | G06V 20/56 |
| 11,585,665 B2* | 2/2023 | Suzuki | G01C 21/30 |
| 11,874,135 B2* | 1/2024 | Mori | G01C 21/3815 |
| 2011/0153190 A1* | 6/2011 | Rolinski | G01C 21/206 |
| | | | 701/533 |
| 2014/0269191 A1* | 9/2014 | Iverson | G01S 15/89 |
| | | | 367/88 |
| 2017/0053538 A1* | 2/2017 | Samarasekera | G08G 5/0069 |
| 2019/0204089 A1* | 7/2019 | Rochan Meganathan | |
| | | | G01S 13/89 |
| 2019/0308712 A1* | 10/2019 | Akuzawa | B63H 20/12 |
| 2020/0109954 A1* | 4/2020 | Li | G01C 21/3848 |
| 2020/0355505 A1* | 11/2020 | Suzuki | G08G 1/0112 |
| 2021/0245777 A1* | 8/2021 | Mori | B60W 60/001 |
| 2023/0004169 A1* | 1/2023 | Kido | G01S 13/931 |
| 2024/0184311 A1* | 6/2024 | Dake | G05D 1/248 |

FOREIGN PATENT DOCUMENTS

| | | | |
|---|---|---|---|
| JP | 2010204419 A | | 9/2010 |
| JP | 2014-085420 A | | 5/2014 |
| JP | 2015-153059 A | | 8/2015 |
| JP | 2018084699 A | | 5/2018 |
| WO | 2018100747 A1 | | 6/2018 |

OTHER PUBLICATIONS

Japanese Office Action dated Feb. 20, 2023 issued for JP Application No. 2020042889.
International Search Report dated May 25, 2021 issued in corresponding PCT Application PCT/JP2021/008358.

* cited by examiner

MAP GENERATION METHOD AND MAP GENERATION DEVICE

CROSS-REFERENCE TO RELATED APPLICATIONS

This application is a national stage application pursuant to 35 U.S.C. § 371 of International Application No. PCT/JP2021/008358, filed on Mar. 4, 2021 which claims priority under 35 U.S.C. § 119 to Japanese Patent Application No. 2020-042889 filed on Mar. 12, 2020, the disclosures of which are hereby incorporated by reference in their entireties.

TECHNICAL FIELD

The present invention relates to a method of generating a map such as a nautical chart usable, for example, for navigating a ship, and to a device for generating the map.

BACKGROUND ART

Conventionally, a configuration is known, in which when generating a nautical chart (hereinafter, also referred to as a map) usable for automatic navigation and automatic berthing and unberthing of a ship, a map is generated by detecting objects and structures in the vicinity of the ship with use of a sensor such as a radar and a camera.

Patent Document 1 discloses a technique of using two different distance sensors according to a target distance, when generating map information for automatic berthing and unberthing of a ship. Specifically, two types of sensors, a first sensor and a second sensor, are mounted on a ship. Further, a measurable distance of the second sensor is shorter than that of the first sensor, and measurement accuracy of the second sensor is higher than that of the first sensor. Further, a controller acquires first environmental information detected by the first sensor and second environmental information detected by the second sensor, respectively, and when a distance to a berthing location is longer than a predetermined distance, the controller generates a map (hereinafter, referred to as a wide-area low-resolution map or a wide area map) reflecting a berthing location recognized based on the first environmental information, and when the distance to the berthing location is shorter than the predetermined distance, the controller generates a map (hereinafter, referred to as a narrow-area high-resolution map, or a high resolution map) reflecting a berthing location recognized based on the second environmental information. In other words, the controller switches environmental information to be used between the first environmental information and the second environmental information according to a distance to a berthing location, and generates a map individually based on selected environmental information.

CITATION LIST

Patent Literature

Patent Document 1: International Publication No. WO2018/100747

DISCLOSURE OF INVENTION

Problems to be Solved by the Invention

A map suitable for use by a ship for automatic navigation in the open sea (offshore) is different from a map suitable for use by the ship for automatic berthing and unberthing (automatic berthing and unberthing within a port). In other words, a map suitable for automatic navigation in the open sea requires a wide area, although the resolution may be low. In other words, a wide-area low-resolution map is required. In contrast, a map suitable for automatic berthing and unberthing requires a high resolution, although the area may be narrow. In other words, a narrow-area high-resolution map is required.

In a case where a wide-area low-resolution map and a narrow-area high-resolution map are generated individually by switching environmental information as disclosed in Patent Document 1, an occupation state near a boundary of a plurality of maps (a state as to whether objects and the like serving as obstacles are present) may become indefinite. For this reason, it is necessary to combine a high resolution map and a wide area map.

However, in a case where a high resolution map and a wide area map are simply combined, a grid width of a map (a width of a grid on a map that determines a resolution) is adjusted to one of the resolutions, and an inconsistency may occur. In other words, when a grid width of a map is decreased (to about a few hundred millimeters) to match a high resolution map, a wide area map may have useless fine grids, and memory consumption may be excessively increased. On the other hand, when a grid width of a map is increased (to about several meters) to match a wide area map, high resolution characteristics may be lost.

The present invention has been made in consideration of these points, and an object of the present invention is to provide a map generation method and a map generation device capable of reducing an amount of information and acquiring an area having a high resolution as necessary.

Means for Solving the Problems

A solving means of the present invention to achieve the above-described object is premised on a map generation method in which a map is generated by using a first sensor that detects information on surrounding objects and terrain, and a second sensor that detects surrounding objects and terrain in a narrow detection range and with a high resolution as compared with the first sensor. The map generation method includes: a second map generation step of generating a second map having a predetermined grid width, based on a detection result of the second sensor; a first map generation step of generating a first map having a grid width wider than the grid width of the second map, based on a detection result of the first sensor; and a composite map generation step of generating a composite map having the grid width of the first map and the grid width of the second map.

By this specific matter, in a generated composite map, a grid width becomes relatively wide in an area where objects and the like are relatively far away and high accuracy is not required for a position of the objects and the like (an area corresponding to a first map generated based on information (detection result) on surrounding objects and terrain detected by the first sensor). On the other hand, a grid width becomes relatively narrow in an area where objects and the like are relatively close and high accuracy is required for a position of the objects and the like (an area corresponding to a second map generated based on information on surrounding objects and terrain detected by the second sensor). Thus, in the present invention, a map (first map) having an area in which a wide area is required although the resolution may be low as a target, and a map (second map) having an area in which a high resolution is required although the area may be narrow as a target are allowed to be present on one composite map with different grid widths on the map. In the conventional art in which a wide-area low-resolution map and a narrow-area high-resolution map are individually generated and switched, an occupation state near a boundary of a plurality of maps may become indefinite. However, according to the present invention, such an inconvenience does not occur. In addition, since a low resolution area is present on the composite map, memory consumption of the composite map as a whole can be suppressed. In addition, since a high resolution area is present on the composite map, a sufficient resolution can be secured for an area where a high resolution is required.

Further, the composite map generation step includes a first area generation step of generating, on the composite map, an area having the grid width of the first map according to information on the surrounding objects and terrain of the first map, and a second area generation step of generating, on the composite map, an area having the grid width of the second map according to information on the surrounding objects and terrain of the second map.

Thus, a first map and a second map are combined into a composite map by the area generation steps. This allows a low resolution area and a high resolution area to be present on a composite map, as described above.

Further, in the composite map generation step, generation of the first area and the second area uses a tree structure, and a depth of a tree structure in setting the second area on the composite map is set to be deeper than a depth of a tree structure in setting the first area.

When setting a grid width of each of a first map area and a second map area on a composite map, an existing tree structure is used, and each grid width is determined by setting a depth of the tree structure. Therefore, processing of setting each grid width can be simplified.

The first sensor is a long distance (LD) sensor, and the second sensor is an electro-optical (EO) sensor. An example of the LD sensor is a radar. Examples of the EO sensor include light detection and ranging (LIDAR) and a camera.

The EO sensor detects surrounding objects and terrain by using an electromagnetic wave having a relatively short wavelength, and has a high distance resolution although a maximum detection distance is relatively short. On the other hand, the LD sensor detects surrounding objects and terrain by using, for example, a radio wave and sound, and has a long maximum detection distance although a distance resolution is relatively low. By using characteristics of these sensors, it is possible to generate a high-resolution second map and a wide-area first map according to the requirements, and a composite map to be generated by combining these maps can suppress memory consumption, and secure a sufficient resolution for an area where a high resolution is required.

Further, a grid width of the first map and a grid width of the second map are set as a fixed value according to a distance resolution of each of the first sensor and the second sensor.

The first map to be generated based on information (detection result) on surrounding objects and terrain detected by the first sensor whose resolution is lower than that of the second sensor, does not require high accuracy. Therefore, a grid width on the map may be relatively wide. On the other hand, the second map to be generated based on information on surrounding objects and terrain detected by the second sensor whose resolution is higher than that of the first sensor, requires high accuracy. Therefore, a grid width on the map needs to be narrow as compared with a wide area map. By setting each of these grid widths to a fixed value according to a distance resolution of each sensor, arithmetic processing in the composite map generation step can be simplified, processing load of a computer can be reduced, and a computation speed can be increased.

Further, a generation method of the second map in the second map generation step uses simultaneous localization and mapping (SLAM), which is a method of generating a map based on self-position estimation.

The second map (high resolution map) is generated by using SLAM, which is proven to be a map generation method. Therefore, a high resolution map with high reliability can be generated.

Further, the second sensor is LIDAR, and, in addition to the first sensor and the second sensor, a camera is provided as a third sensor capable of detecting surrounding objects and terrain in a narrow detection range and with a high resolution as compared with the first sensor. The map generation method further includes a third map generation step of generating a third map having a predetermined grid width, based on a detection result of the camera. In the composite map generation step, a composite map having the grid width of the third map is generated.

As described above, a third map is generated based on a detection result on surrounding objects and terrain captured (detected) by the camera as the third sensor, and the third map is also combined. Thus, in a case where objects and the like that could not be detected by the second sensor (LIDAR) are present in the vicinity, the objects and the like can be captured by the camera, and the third map is generated and combined based on the capturing information. Therefore, a more reliable composite map can be generated.

Further, when the generated composite map is displayed on a display, an aerial map stored in advance is displayed as an area associated with the composite map in a superimposed manner.

According to the above configuration, even when a composite map displayed on the display is in an unclear state, immovable structures, buildings, and the like can be clearly displayed on the composite map by displaying the aerial map in a superimposed manner. Thus, visibility of the map can be enhanced.

Further, the first sensor and the second sensor are mounted on a moving object, and when the generated composite map is displayed on a display, at least either one of a target movement trajectory and an actual movement trajectory of the moving object is displayed on the composite map on the display in a superimposed manner.

According to the above configuration, an occupant of the moving object can confirm the target movement trajectory and the actual movement trajectory of the moving object by viewing the composite map on the display. For example, when the moving object is being moved automatically (e.g., a ship is automatically navigating), it is possible to check whether the moving object is properly moving, and to expand the use of a composite map.

Further, the first sensor and the second sensor are mounted on a moving object. When the generated composite map is compared with an aerial map stored in advance as an area associated with the composite map, and when there is a misalignment of an object and terrain on the composite map with respect to an associated object and terrain on the aerial map, position correction of the composite map is performed in a direction that eliminates the misalignment.

According to the above configuration, even when there is a misalignment on a composite map due to a computation error when generating the composite map, an error in estimating a self-position of a moving object, or the like, position correction is performed in such a way as to eliminate the misalignment. Therefore, a more accurate composite map can be generated.

The composite map is used to control a propulsion and steering device mounted in a ship in such a way as to move the ship along a target movement trajectory, when performing automatic navigation and automatic berthing and unberthing of the ship.

According to the above configuration, a wide-area first map suitable for use in automatic navigation in the open sea (offshore), and a high-resolution second map suitable for use in automatic berthing and unberthing (automatic berthing and unberthing within a port) are allowed to be present on one composite map. Therefore, the composite map can be advantageously used in control of a propulsion and steering device for proper automatic navigation and proper automatic berthing and unberthing.

Another solution means is premised on a map generation method in which a map is generated by using a first sensor that detects information on surrounding objects and terrain, and a second sensor that detects surrounding objects and terrain in a narrow detection range and with a high resolution as compared with the first sensor. The map generation method includes: a second map generation step of generating a second map having a predetermined grid width, based on a detection result of the second sensor; a first map generation step of generating a first map having a grid width wider than the grid width of the second map, based on a detection result of the first sensor; and a composite map generation step of generating a composite map having the grid width of the first map and the grid width of the second map. A grid width of the first map in the composite map generation step is set to be wider in an area where the objects and the terrain are located with a longer distance to surrounding objects and terrain detected by the first sensor.

According to this specific matter, in addition to the above-described advantageous effects (suppressing memory consumption of the composite map as a whole, and securing a sufficient resolution for an area where a high resolution is required), the following advantageous effects can be achieved. In other words, in a first map where a high resolution is not required, the resolution of objects and terrain at a long distance can be further lower than that of objects and terrain at a short distance. For this reason, by setting a grid width to be wider in an area where a distance to surrounding objects and terrain detected by the first sensor is longer, memory consumption can be suppressed, while acquiring a minimum required resolution.

In addition, a map generation device that implements the above-described map generation method is also within the scope of the technical concept of the present invention. In other words, the map generation device is premised on a map generation device provided with a first sensor that detects information on surrounding objects and terrain, and a second sensor that detects surrounding objects and terrain in a narrow detection range and with a high resolution as compared with the first sensor, and configured to generate a map by using a detection result of the first sensor and a detection result of the second sensor. The map generation device includes: a second map generation unit that generates a second map having a predetermined grid width, based on a detection result of the second sensor; a first map generation unit that generates a first map having a grid width wider than the grid width of the second map, based on a detection result of the first sensor; and a composite map generation unit that generates a composite map having the grid width of the first map and the grid width of the second map.

Also in a composite map to be generated by the map generation device having a configuration as described above, the first map and the second map are allowed to be present on one composite map with different grid widths on the map. Since a low resolution area is present on the composite map, memory consumption of the composite map as a whole can be suppressed. In addition, since a high resolution area is present on the composite map, a sufficient resolution can be secured for an area where a high resolution is required.

Effect of the Invention

In the present invention, a composite map having a different grid width for each area is generated by combining a high-resolution second map and a wide-area first map. This allows a map (first map) having an area in which a wide area is required although the resolution may be low as a target, and a map (second map) having an area in which a high resolution is required although the area may be narrow as a target to be present on a same map. Consequently, it is possible to generate a map capable of reducing an amount of information, and acquiring a high resolution area as necessary.

DESCRIPTION OF EMBODIMENTS

In the following, an embodiment according to the present invention is described based on the drawings. The present embodiment is described by way of an example in which the present invention is applied to a map generation method and a map generation device for generating a map (nautical chart) used for automatic navigation and automatic berthing and unberthing of a ship.

—Configuration of Ship—

Figure 1:
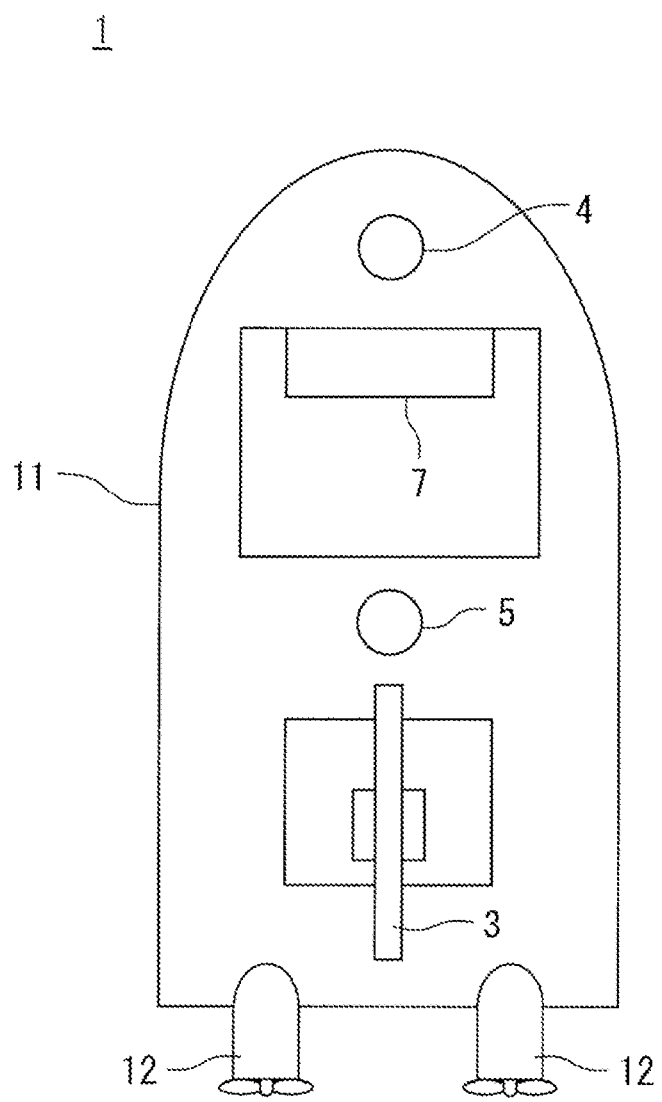
FIG. 1 is a plan view illustrating an overview of a ship according to an embodiment.

FIG. 1 is a plan view illustrating an overview of a ship (moving object according to the present invention) 1 according to the present embodiment. As illustrated in FIG. 1, the ship 1 includes propulsion and steering devices 12, 12 at a rear part of a hull 11. An operation of the propulsion and steering devices 12, 12 enables the ship 1 to move forward and backward, and to change its direction of travel. For this reason, when automatic navigation or automatic berthing and unberthing of the ship 1 is performed, the propulsion and steering devices 12, 12 are automatically controlled in such a way that the ship 1 performs automatic navigation or automatic berthing and unberthing along a target navigation trajectory to be set based on a map generated by a map generation method to be described later.

—Configuration of Map Generation Device—

Figure 2:
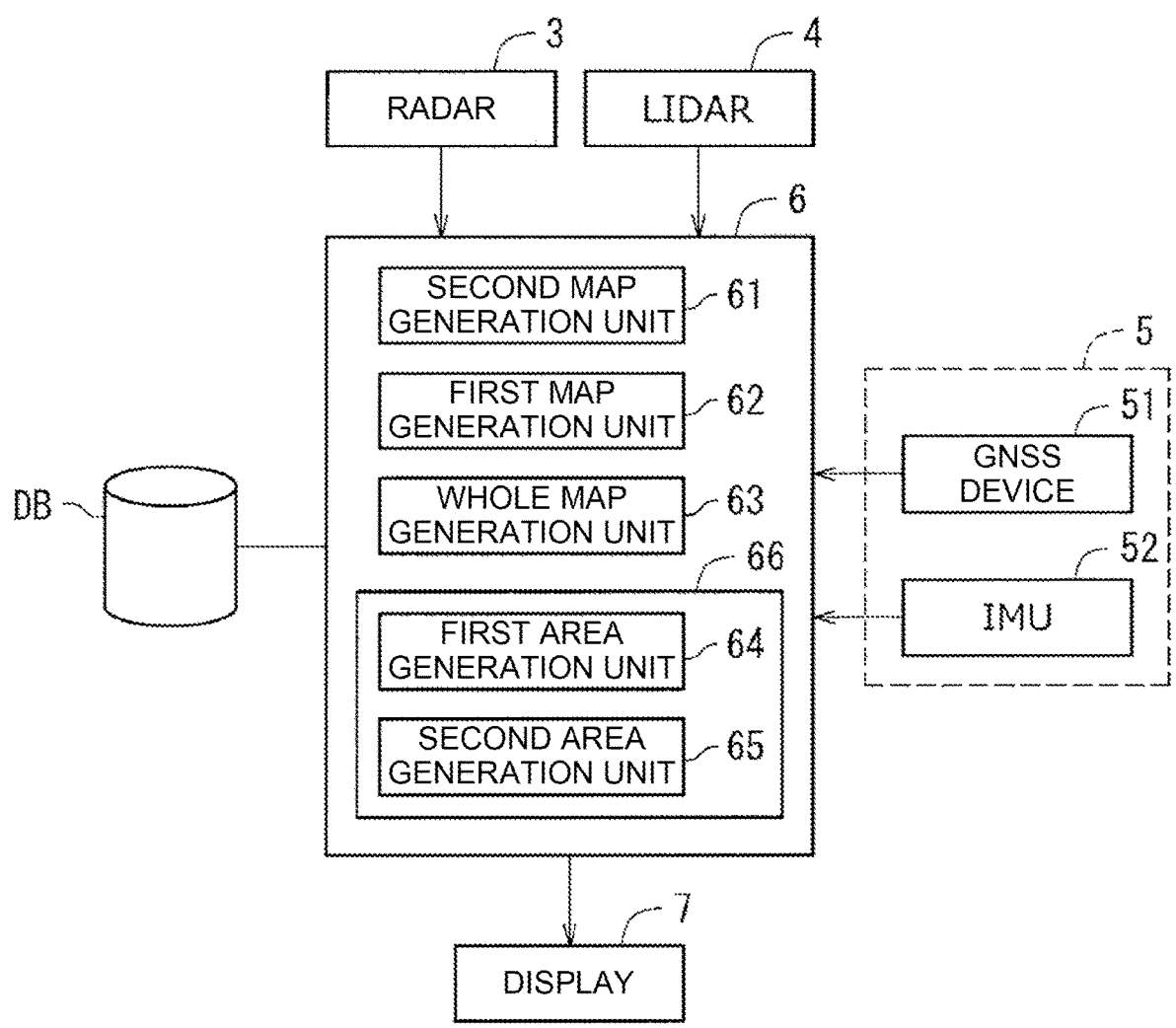
FIG. 2 is a functional block diagram illustrating a configuration of a map generation device.

FIG. 2 is a functional block diagram illustrating a configuration of a map generation device 2 according to the present embodiment. As illustrated in FIGS. 1 and 2, the ship 1 according to the present embodiment includes, as equipment constituting the map generation device 2, a radio detecting and ranging (radar) 3, LIDAR (more specifically, 3D-light detection and ranging; 3D-LIDAR) 4, a global navigation satellite system (GNSS) device 51 and an inertial measurement unit (IMU) 52 as a position estimation unit 5, a controller 6, and a display 7.

The radar (LD sensor according to the present invention) 3 corresponds to a first sensor according to the present invention, and detects surrounding objects and structures (including terrain) by using a radio wave, and measures a distance to the surrounding objects and structures. Specifically, by irradiating a radio wave onto objects and structures far away and receiving a reflected wave of the radio wave with use of the radio wave whose wavelength is longer than that of visible light, the radar 3 measures a distance to the objects and structures, based on a time after irradiation until receiving the reflected wave. The radar 3, for example, has a distance resolution of about 1 m, and a maximum detection distance of about 1 km. Examples of surrounding objects herein include other ships, piles, buoys, driftwood, rocks, and the like on the sea. In addition, examples of surrounding structures include piers, quays, bridges, and the like.

The LIDAR (EO sensor according to the present invention) 4 corresponds to a second sensor according to the present invention, and detects surrounding objects and structures while scanning a laser beam. In other words, by irradiating a laser beam onto surrounding objects and structures, and observing scattered light or reflected light of the laser beam, the LIDAR 4 measures a distance to the objects and structures. Specifically, the LIDAR 4 measures scattered light with respect to laser irradiation that emits light in a pulse form, and measures a distance to objects and structures, based on a time after emission until receiving reflected light. Note that, the LIDAR 4 uses an electromagnetic wave having a much shorter wavelength than that of the radar 3. For example, ultraviolet light, visible light, near-infrared light, and the like are used. The LIDAR 4, for example, has a distance resolution of about 10 mm, and a maximum detection distance of about 100 m. In this way, the LIDAR 4 can detect surrounding objects and structures in a narrow detection range and with a high resolution, as compared with the radar 3. Note that, as the EO sensor, a camera may be used instead of the LIDAR 4.

The GNSS device 51, as is well known, measures a current position of the ship 1 by using a satellite. Specifically, the GNSS device 51 computes coordinates of a current position (coordinates of a self-position in Cartesian coordinates) by comparing signals with time information to be transmitted from each of a plurality of satellites, and computing a difference in time when a radio wave is received.

The IMU 52 derives 3-dimensional angular velocity, acceleration, and angle of the ship 1 by a 3-axis gyroscope and a 3-directional accelerometer. The position estimation unit 5 constituted of the GNSS device 51 and the IMU 52 makes it possible to accurately compute coordinates of a current position of the ship 1 at each predetermined timing.

The controller 6 is constituted of a well-known microcomputer including a CPU, a ROM, a RAM, and the like, and its peripheral circuits, which are not illustrated. The controller 6 generates a map to be described later, based on a map generation program stored in the ROM by receiving each signal from the radar 3, the LIDAR 4, and the position estimation unit 5. Note that, a database DB is connected to the controller 6. The database DB stores in advance information on a target navigation of the ship 1, map information on the vicinity of a plurality of ports where the ship 1 may berth and unberth, and the like.

The display 7 is disposed in front of a driver's seat of the ship 1, and displays a map by receiving, from the controller 6, map information generated by the controller 6. A display pattern of a map on the display 7 is described later.

(Configuration of Controller)

As a feature of the present embodiment, the controller 6 has a plurality of functional parts for map generation. These functional parts are functional parts on the map generation program. Specifically, the controller 6 includes a second map generation unit 61, a first map generation unit 62, a whole map generation unit 63, a first area generation unit 64, and a second area generation unit 65. The first area generation unit 64 and the second area generation unit 65 constitute a composite map generation unit 66.

The second map generation unit 61 receives an output from the LIDAR 4, and generates a second map (high resolution map) having a predetermined grid width (grid width on a map), based on information (detection result) on surrounding objects and structures detected by the LIDAR 4. Since a detection range of objects and structures detectable by the LIDAR 4 is relatively narrow, a map to be generated herein also becomes a map (narrow-range high-resolution map) in which objects and structures within a relatively narrow range (about 100 m) are targets. In addition, accuracy of position information to be acquired from the LIDAR 4 is relatively high, and in a case where a distance resolution is about 10 mm, an actual position of detected objects and structures is within a range of about 10 mm with respect to a measurement point of the objects and structures.

The first map generation unit 62 receives an output from the radar 3, and generates a first map (wide area map) having a predetermined grid width, based on information on surrounding objects and structures detected by the radar 3. Since a detection range of objects and structures detectable by the radar 3 is relatively wide, a map to be generated herein also becomes a map (wide-area low-resolution map) in which objects and structures within a relatively wide range (about 1 km) are targets. In addition, accuracy of position information to be acquired from the radar 3 is relatively low, and in a case where a distance resolution is about 1 m, an actual position of detected objects and structures is within a range of about 1 m with respect to a measurement point of the objects and structures.

The whole map generation unit 63 generates a whole map including a moving range of the ship 1. Specifically, for example, in a case where the ship 1 automatically berths and unberths, the whole map generation unit 63 reads, from the database DB, map information on a port and its vicinity including a pier where the automatic berthing and unberthing is performed, and generates, as a whole map, a range of a map including the moving range of the ship 1.

The first area generation unit 64 and the second area generation unit 65 combine, on a whole map, each map generated by each of the second map generation unit 61 and the first map generation unit 62 according to presence or absence of surrounding objects and structures and positions thereof by dividing a grid width for each area on a map, and generates a composite map having a different grid width for each area.

Specifically, the first area generation unit 64 combines (area generation) with respect to a whole map by setting an area where surrounding objects and structures detected by the radar 3 are present, as a first map (wide-area low-resolution map) having a predetermined grid width. On the other hand, the second area generation unit 65 combines (area generation) with respect to the whole map by setting an area where surrounding objects and structures detected by the LIDAR 4 are present, as a second map (narrow-area high-resolution map) having a grid width narrower than the grid width of the first map. In this way, as a method of dividing a grid width for each area on a map, a tree structure called Quad Trees is used. A specific method of dividing a grid width by using the quad tree is described later.

—Map Generation—

Figure 3:
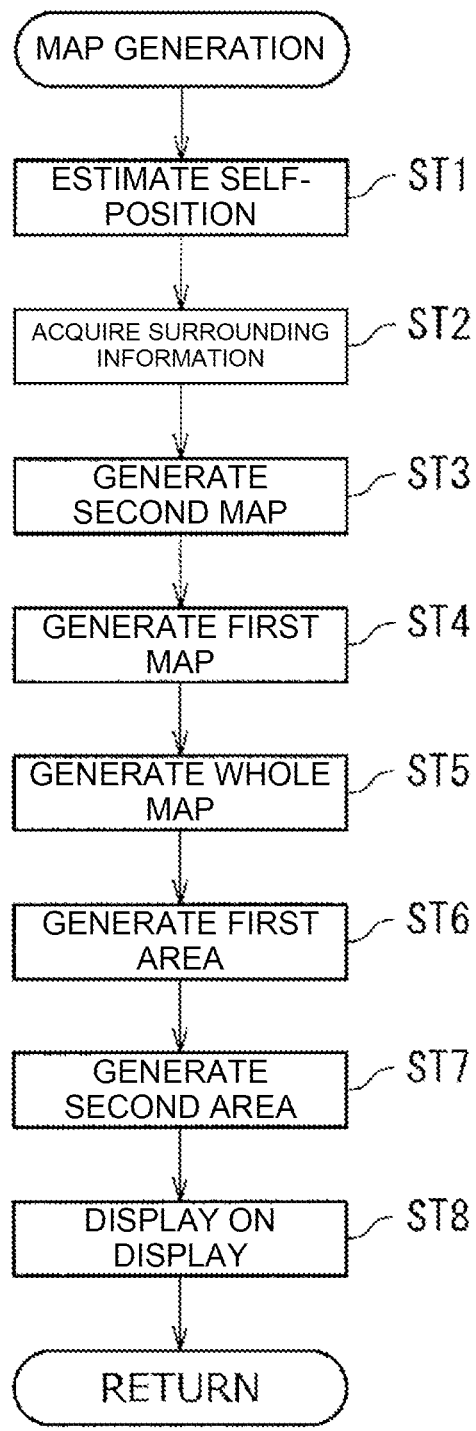
FIG. 3 is a flowchart illustrating a map generation procedure.

Next, a map generation procedure to be performed by the map generation device 2 configured as described above is described. FIG. 3 is a flowchart illustrating a map generation procedure according to the present embodiment. The flowchart is performed, for example, when implementation of automatic navigation or automatic berthing and unberthing of the ship 1 is instructed.

First, in step ST1, a self-position of the ship 1 is estimated. As the self-position estimation operation, the GNSS device 51 compares signals with time information to be transmitted from each of a plurality of satellites, and computes coordinates of a current position by computing a difference in time when a radio wave is received. In addition to the above, the IMU 52 derives three-dimensional angular velocity, acceleration, and angle of the ship 1, whereby a self-position is accurately estimated even during navigation of the ship 1.

Thereafter, in step ST2, surrounding information is acquired. Specifically, surrounding information from the radar 3 and surrounding information from the LIDAR 4 are acquired respectively. Surrounding information from the radar 3 is information on a distance to objects and structures within a distance of about 1 km, and becomes information in which a distance resolution is about 1 m. Surrounding information from the LIDAR 4 is information on a distance to objects and structures within a distance of about 100 m, and becomes information in which a distance resolution is about 10 mm.

Thereafter, in step ST3, second map generation is performed. This operation is performed by the second map generation unit 61. Specifically, a second map is generated based on information on surrounding objects and structures detected by the LIDAR 4. As a specific generation method of the second map in this case, well-known SLAM is used. The SLAM is a method known as a method of generating an environmental map based on self-position estimation, and can generate an environmental map even in an unknown environment. Thus, a second map (narrow-area high-resolution map) is generated. At this point, a map is not yet displayed on the display 7, and data for generating a second map are being generated. The operation of step ST3 corresponds to a second map generation step according to the present invention.

Thereafter, in step ST4, first map generation is performed. The operation is performed by the first map generation unit 62. Specifically, a first map having a grid width wider than the grid width of the second map is generated based on information on surrounding objects and structures detected by the radar 3. A specific generation method of the first map is also similar to the second map generation method described above. Thus, the first map (wide-area and low-resolution map) is generated. Also at this point, a map is not yet displayed on the display 7, and data for generating a first map are being generated. The operation of step ST4 corresponds to a first map generation step according to the present invention.

In step ST5, a whole map is generated. This operation is performed by the whole map generation unit 63. Specifically, for example, in a case where the ship 1 automatically berths and unberths, map information on a port and its vicinity including a pier where the automatic berthing and unberthing is performed is read from the database DB, and a range of a map including a moving range of the ship 1 is generated as a whole map. The whole map is handled as a map in which the entirety is constituted of one grid.

In step ST6, combination of the first map (first area generation) with respect to the whole map is performed. This operation is performed by the first area generation unit 64. Specifically, the first map generated by the first map generation unit 62 is combined on the whole map having a predetermined grid width according to presence or absence of surrounding objects and structures and positions thereof. When combining the first map, the following quad tree is used.

Figure 4:
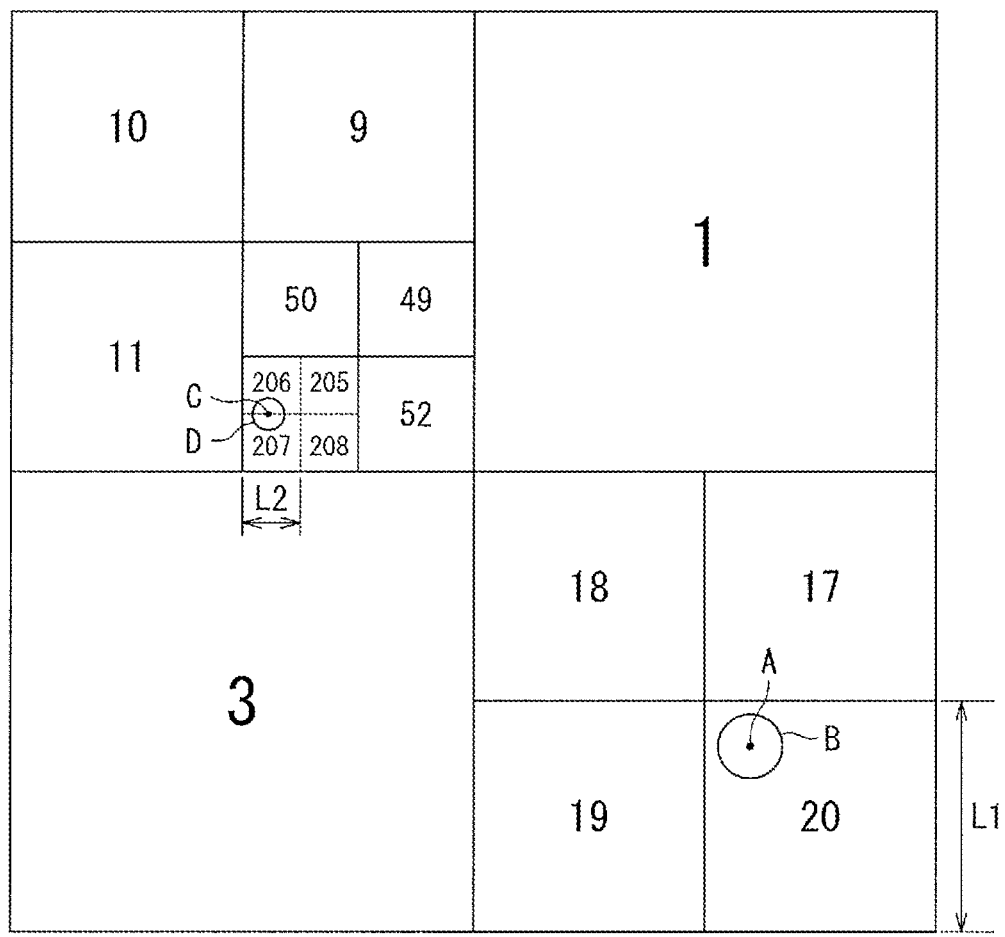
FIG. 4 is a diagram illustrating a quad tree on a map according to a resolution.
Figure 5:
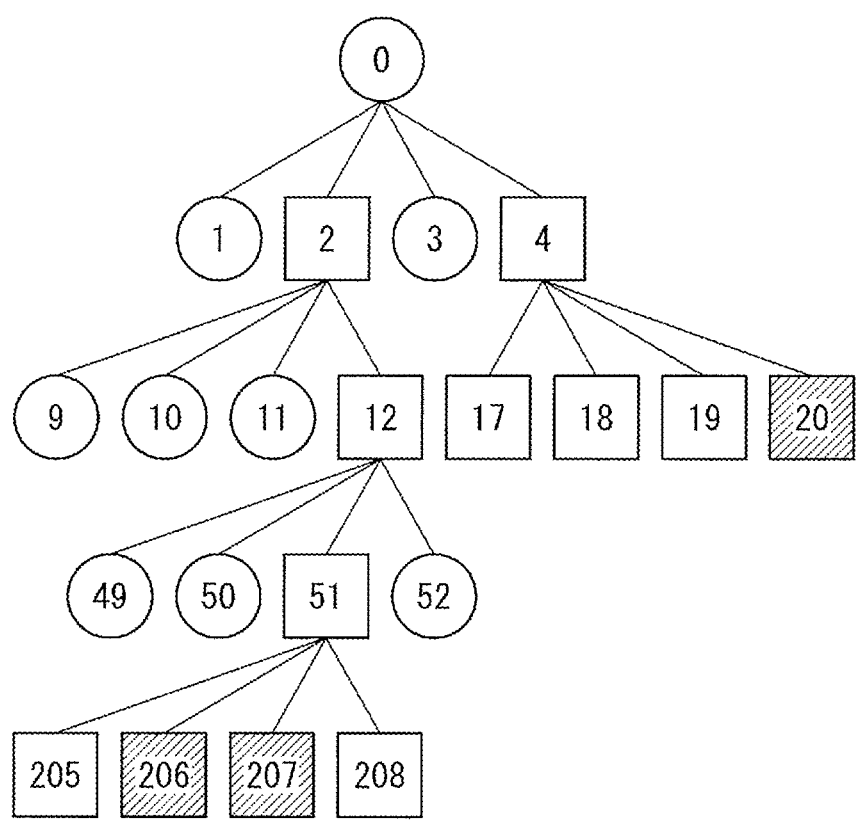
FIG. 5 is a diagram illustrating a depth of a quad tree according to a resolution.

FIG. 4 is a diagram illustrating a quad tree on a map according to a resolution. FIG. 5 is a diagram illustrating a depth of a quad tree according to a resolution.

Herein, regarding grid dividing, an example is described in which a grid width of a first map is set to a grid width associated with a depth 2 in a quad tree (a case where a grid width associated with the depth 2 is considered to be sufficient because a high resolution is not required). A measurement point (measurement point A in FIG. 4) based on information from the radar 3 has a circle B with a radius (e.g., about 1 m) associated with a pixel distance of the radar 3 used in generating the first map. Herein, it is assumed that the circle B has the measurement point A as its center, and the circle B is referred to as a measurement determination circle.

In the first map, since it is sufficient to use, as a grid width, a grid width associated with the depth 2 in a quad tree, a grid of the whole map is divided twice. In other words, the whole map is divided into four grids, a grid 1 to a grid 4 in FIGS. 4 and 5 (at this point, the measurement point A is present in the fourth quadrant (grid 4)). Then, a node of the grid 4 is divided into four grids, a grid 17 to a grid 20 (at this point, the measurement point A is present in the fourth quadrant (grid 20)). After the dividing, the measurement determination circle B is compared with the grid 17 to the grid 20, and a grid that achieves a state in which the measurement determination circle B encompasses the grid, the grid encompasses the measurement determination circle B, or the grid includes a part of the measurement determination circle B is occupied. FIGS. 4 and 5 illustrate a state in which the grid 20 is occupied. By performing processing as described above with respect to all measurement points acquired by information from the radar 3, and performing processing of occupying a grid with respect to each of all the measurement points, a first map (wide-area low-resolution map) whose grid width becomes a distance L1 in FIG. 4 is combined with respect to the whole map.

In step ST7, combination of a second map (second area generation) with respect to the whole map is performed. This operation is performed by the second area generation unit 65. Specifically, a second map generated by the second map generation unit 61 is combined on the whole map with a predetermined grid width (a grid width narrower than the grid width of the first map) according to presence or absence of surrounding objects and structures and positions thereof. The following quad tree is used also in combining the second map.

Herein, regarding grid dividing, an example is described in which a grid width of a second map is set to a grid width associated with a depth 4 in a quad tree (a case where a grid width is set to a grid width associated with the depth 4 because a high resolution is required). A measurement point (measurement point C in FIG. 4) based on information from the LIDAR 4 has a circle D with a radius (e.g., about several tens mm) associated with a grid width of SLAM (Little SLAM) used in generating the second map. Herein, it is assumed that the circle D has the measurement point C as its center, and the circle D is referred to as a measurement determination circle.

In the second map, a grid width associated with the depth 4 in a quad tree is required as a grid width. Since processing of dividing into the grid 1 to the grid 4 has already been performed in the above-described step ST6, the actual number of times of divisions herein is three. In other words, a node of the grid 2 is divided into four grids, a grid 9 to a grid 12, and a node of the grid 12 is divided into four grids, a grid 49 to a grid 52, and a node of the grid 51 is divided into four grids, a grid 205 to a grid 208. After the dividing, the measurement determination circle D is compared with the grid 205 to the grid 208, and a grid that achieves a state in which the measurement determination circle D encompasses the grid, the grid encompasses the measurement determination circle D, or the grid includes a part of the measurement determination circle D is occupied. FIGS. 4 and 5 illustrate a state in which the grid 206 and the grid 207 are occupied. By performing processing as described above with respect to all measurement points acquired by information from the LIDAR 4, and performing processing of occupying a grid with respect to each of all the measurement points, a second map (narrow-area high-resolution map) whose grid width becomes a distance L2 in FIG. 4 is combined with respect to the whole map. In this case, since an area (ray-cast area) where no object or the like is present does not necessarily have to have a grid width associated with the depth 4 in a quad tree, it becomes possible to suppress memory consumption by setting a plurality of ray-cast areas altogether as an upper layer.

Note that, when combining a second map (second area generation) in step ST7, even when it is determined that there is no object or structure on the second map, in a case where the first map includes an area where objects and structures are determined to be present (in a case where objects and structures that could be detected by the radar 3 but could not be detected by the LIDAR 4 are present in a same area), information on the first map is integrated by assuming that objects or structures are present in the area.

The operations of step ST6 and step ST7 correspond to a composite map generation step according to the present invention.

Note that, as a measure with respect to an object near the water surface, in a case where an object is determined to be present near the water surface by object recognition in an image within a first map generated by information from the radar 3, information on the object is stored as a buffer in such a way that the information is not erased by a second map within a port generated by SLAM, and the object near the water surface is superimposed on the second map within the port generated by the SLAM.

Figure 6:
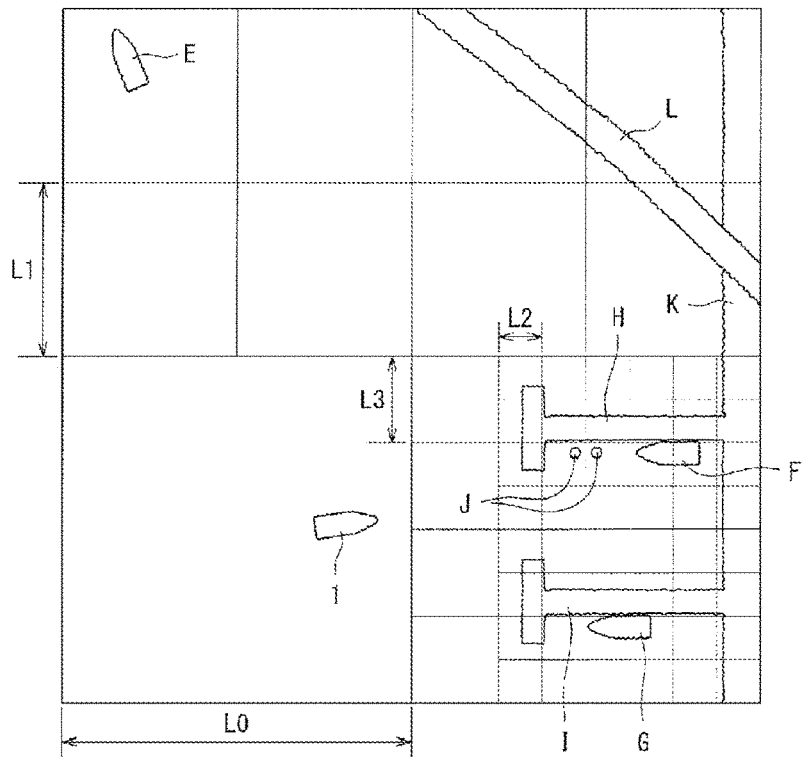
FIG. 6 is a diagram illustrating an example of a generated composite map.

In step ST8, a composite map generated as described above is displayed on the display 7. FIG. 6 illustrates an example of a composite map displayed on the display 7. In FIG. 6, signs E, F, and G denote other ships, signs H and I denote piers, a sign J denotes a pile, a sign K denotes a quay, and a sign L denotes a bridge, which are displayed on a composite map. Regarding each grid in FIG. 6, grids having grid widths L0 and L1 are portions where combination of the first map (wide-area low-resolution map) is performed, and grids having grid widths L2 and L3 are portions where combination of the second map (narrow-area high-resolution map) is performed. Note that, these grids are not depicted on a composite map to be actually displayed on the display 7. Alternatively, a grid may be depicted on a composite map to be displayed on the display 7.

Figure 7:
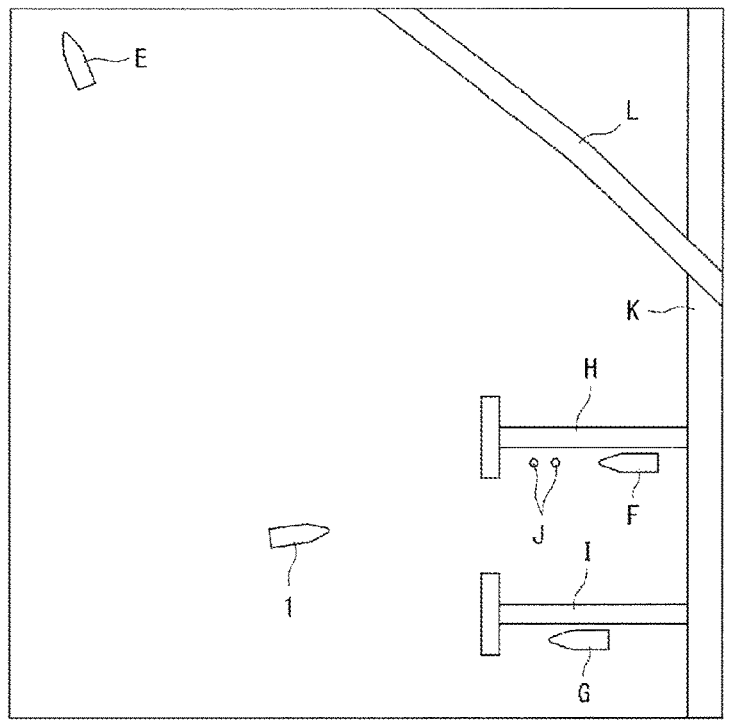
FIG. 7 is a diagram illustrating an aerial photograph associated with the composite map in FIG. 6.

FIG. 7 illustrates an actual aerial photograph (aerial photograph for comparison with a composite map) at a timing when the composite map in FIG. 6 is generated for the purpose of confirming reliability of a composite map. As is clear from FIGS. 6 and 7, surrounding objects and structures E to L are properly reproduced on a composite map, and a composite map of high reliability is generated.

Advantageous Effects of Embodiment

As described above, in the present embodiment, a map (a first map; a wide-area low-resolution map) having an area in which a wide area is required although the resolution may be low as a target, and a map (a second map; a narrow-area high-resolution map) having an area in which a high resolution is required although the area may be narrow as a target are allowed to be present on one composite map with different grid widths on the map. In the conventional art in which a wide-area low-resolution map and a narrow-area high-resolution map are individually generated and switched, an occupation state near a boundary of a plurality of maps may become indefinite. However, according to the present embodiment, such an inconvenience does not occur. In addition, since a low resolution area is present on a composite map, memory consumption of the composite map as a whole can be suppressed. In addition, since a high resolution area is present on the composite map, a sufficient resolution can be secured for an area where a high resolution is required. Thus, it is possible to generate a highly practical map in which a map suitable for use in performing automatic navigation of a ship in the open sea (offshore), and a map suitable for use in performing automatic berthing and unberthing of the ship (automatic berthing and unberthing within a port) are present.

In the present embodiment, the radar 3 is used as a means that acquires information for generating a first map, and the LIDAR 4 is used as a means that acquires information for generating a second map, respectively. By using characteristics of these sensors, generation of the first map and generation of the second map are performed according to the requirements. Therefore, a composite map to be generated by combining these maps can suppress memory consumption, and secure a sufficient resolution for an area where a high resolution is required.

In the present embodiment, each grid width, which is different for each area being divided for each area on a map, is set as a fixed value according to a distance resolution of each of the radar 3 and the LIDAR 4. This makes it possible to simplify arithmetic processing when generating a composite map, reduce processing load of a computer, and increase a computation speed.

In addition, according to the present embodiment, a quad tree is used to divide a grid width in each area on a map, and each grid width is determined by setting a depth of the quad tree. Therefore, processing of setting each grid width can be simplified.

Furthermore, in the present embodiment, SLAM is used as a method of generating a second map. By generating a second map with use of SLAM, which is proven to be a map generation method as described above, the second map of high reliability can be generated.

Modification Example 1

Next, a modification example 1 is described. The present modification example is an example in which a camera is mounted on the ship 1 as a third sensor. A configuration related to the camera, and a configuration and a method other than a map generation method are similar to those in the above-described embodiment. Therefore, only the configuration related to the camera and the map generation method are described herein.

Figure 8:
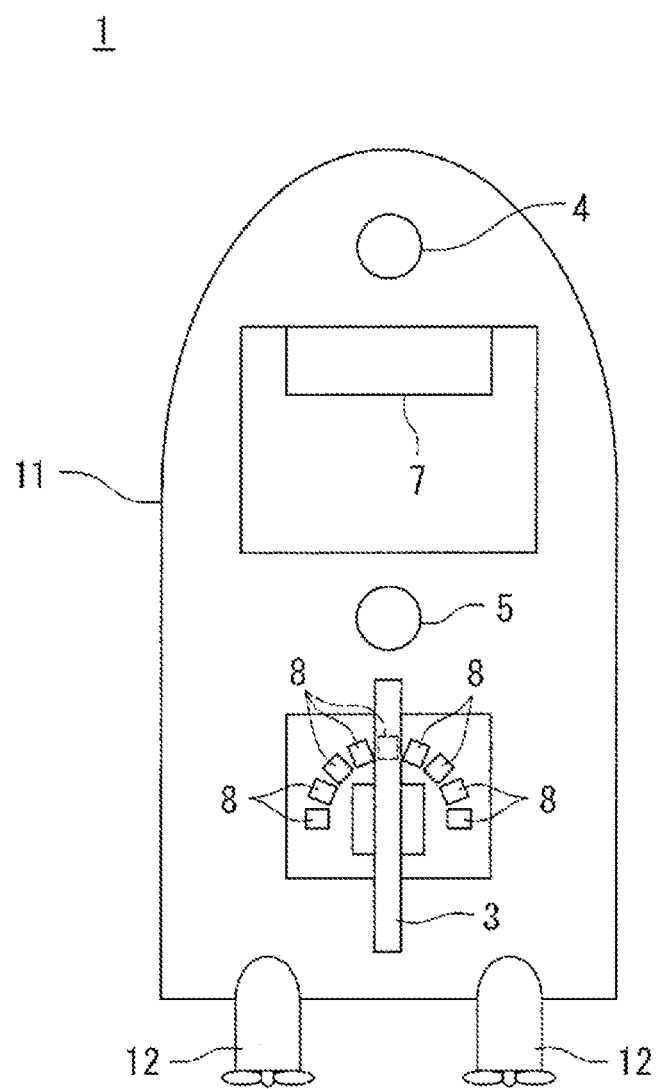
FIG. 8 is a diagram equivalent to FIG. 1 in a modification example 1.
Figure 9:
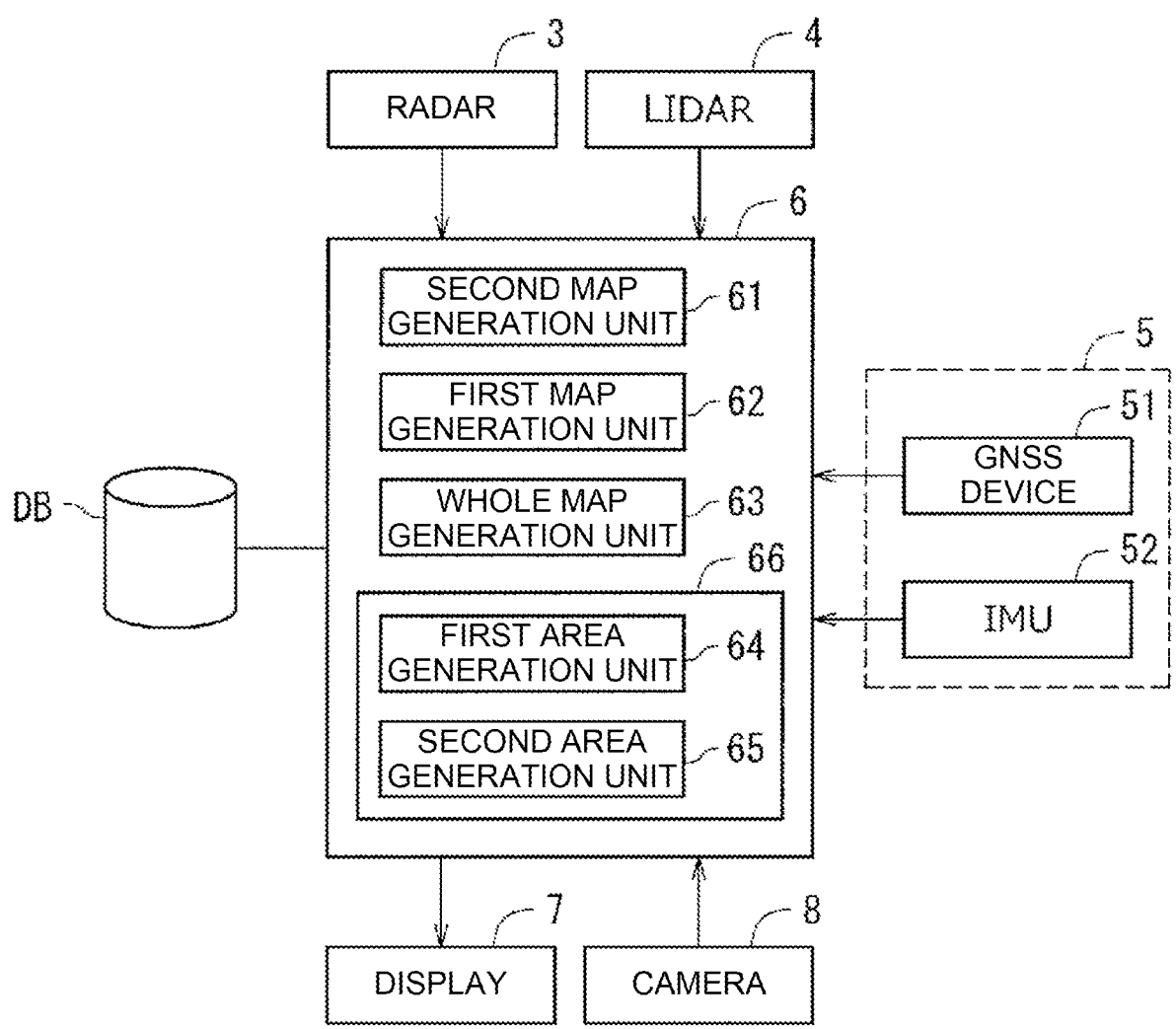
FIG. 9 is a diagram equivalent to FIG. 2 in the modification example 1.

FIG. 8 is a diagram equivalent to FIG. 1 (plan view illustrating an overview of the ship 1) in the present modification example. FIG. 9 is a diagram equivalent to FIG. 2 (functional block diagram) in the present modification example. As illustrated in FIG. 8, a plurality of cameras 8, 8, . . . are disposed on the hull 11 of the ship 1. In the present modification example, nine cameras 8, 8, . . . are disposed in an arc shape on a same horizontal plane, and are capable of detecting objects and structures present in an angular range of 180° from a front to a side of the ship 1. These cameras 8, 8, . . . are connected to the controller 6, and information on images (images in front of the ship 1 and images on the side of the ship 1) captured by the cameras 8, 8, . . . are transmitted to the controller 6. Similarly to the LIDAR 4, the camera 8 is capable of detecting surrounding objects and structures in a narrow detection range and with a high resolution as compared with the radar 3.

In the present modification example, the controller 6 receives an output from the LIDAR 4 and an output (information on images) from the cameras 8, 8, . . . , and generates not only the second map (high resolution map) having a predetermined grid width (width of a grid on a map), based on information on surrounding objects and structures detected by the LIDAR 4, but also generates a high resolution map (hereinafter, referred to as a third map) also having a predetermined grid width, based on information on surrounding objects and structures captured by the cameras 8, 8, . . . . In other words, in the present modification example, two types of high resolution maps are generated.

Further, in the present modification example, not only an area where surrounding objects and structures detected by the LIDAR 4 are present is combined, with respect to a whole map, as a second map having a grid width narrower than the grid width of the first map, but also an area where surrounding objects and structures captured by the cameras 8, 8, . . . are present is combined, with respect to the whole map, as a third map having a grid width narrower than the grid width of the first map. In other words, in the present modification example, each of two types of high resolution maps is combined.

Figure 10:
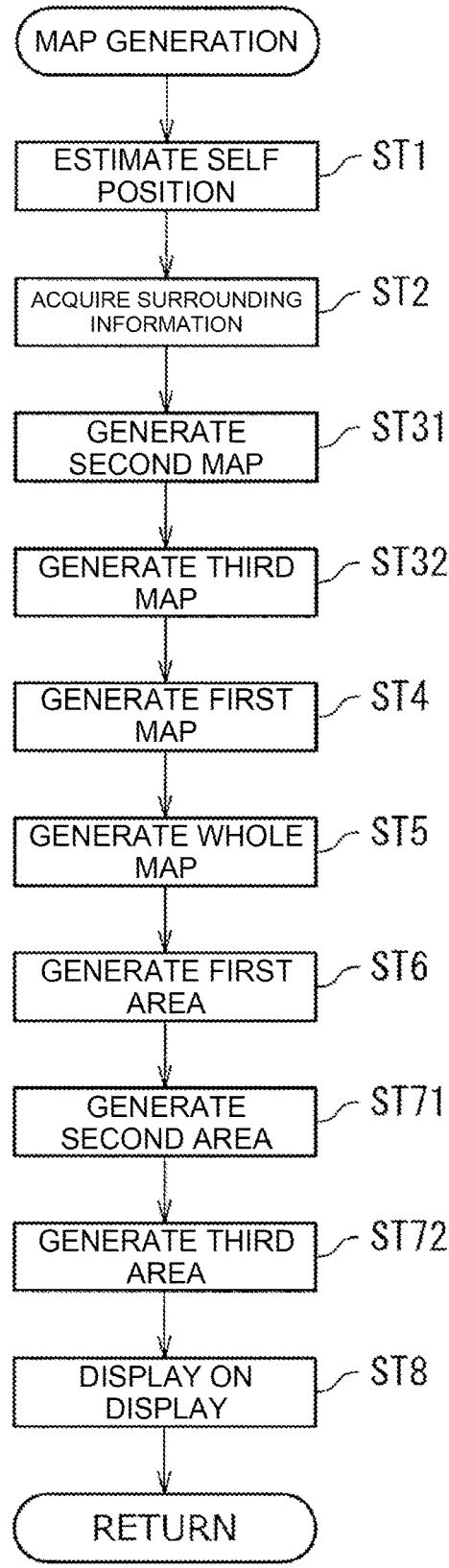
FIG. 10 is a diagram equivalent to FIG. 3 in the modification example 1.

FIG. 10 is a diagram equivalent to FIG. 3 (flowchart illustrating a map generation procedure) in the present modification example. Operations of steps ST1, ST2, ST4 to ST6, and ST8 are similar to those in the above-described embodiment.

In step ST31, similarly to the operation of step ST3 in the above-described embodiment, a second map having a predetermined grid width is generated based on information on surrounding objects and structures detected by the LIDAR 4. In step ST32, a third map having a predetermined grid width is generated based on information on surrounding objects and structures captured by the cameras 8, 8, . . . . SLAM is also used as a specific generation method of the third map. The operation of step ST32 corresponds to a third map generation step according to the present invention.

Then, after combination of the first map (first area generation) with respect to the whole map is performed in step ST6, in step ST71, combination of the second map (second area generation) with respect to the whole map is performed. The operation of step ST71 is performed similarly to the operation of step ST7 in the above-described embodiment (an operation of combining a second map by setting a grid width with use of a quad tree).

In step ST72, combination of the third map (third area generation) with respect to the whole map is performed. This operation is performed by the composite map generation unit 66. Specifically, a generated third map is combined, on a whole map, with a predetermined grid width (grid width narrower than the grid width of the first map) according to presence or absence of surrounding objects and structures and positions thereof. When combining the third map, a quad tree is also used. Since an operation of combining a map by setting a grid width with use of a quad tree has been described above, description thereof is omitted herein.

Note that, when combining a second map, a depth in a quad tree for determining a grid width is set to be the depth 4, similarly to the case of the above-described embodiment. Further, when combining a third map, a depth in a quad tree may be set to the depth 4 similarly, or may be set to a depth 5 or more.

As described above, a composite map is generated by performing combination of a first map, combination of a second map, and combination of a third map with respect to a whole map in order, and the composite map is displayed on the display 7 in step ST8.

In the present modification example, in addition to the configuration and the map generation method according to the above-described embodiment, a third map is generated based on information on surrounding objects and terrain captured by the cameras 8, 8, . . . , as a third sensor, and by combining the third map as well, in a case where objects and the like that could not be detected by the LIDAR 4 are present in the vicinity, the objects and the like can be captured by the cameras 8, 8, . . . , and the third map can be generated and combined based on the capturing information. This makes it possible to generate a more reliable high resolution map.

Modification Example 2

Next, a modification example 2 is described. The present modification example is a modification example of a map display pattern on the display 7. Specifically, the pattern is a pattern acquired by displaying, on a composite map generated in the above-described embodiment or the modification example 1, an aerial map associated with the composite map in a superimposed manner. For example, among map information in the vicinity of a plurality of ports stored in the database DB, an aerial map in the vicinity of a port associated with a composite map generated by a map generating operation at this time is displayed in a superimposed manner.

Figure 11:
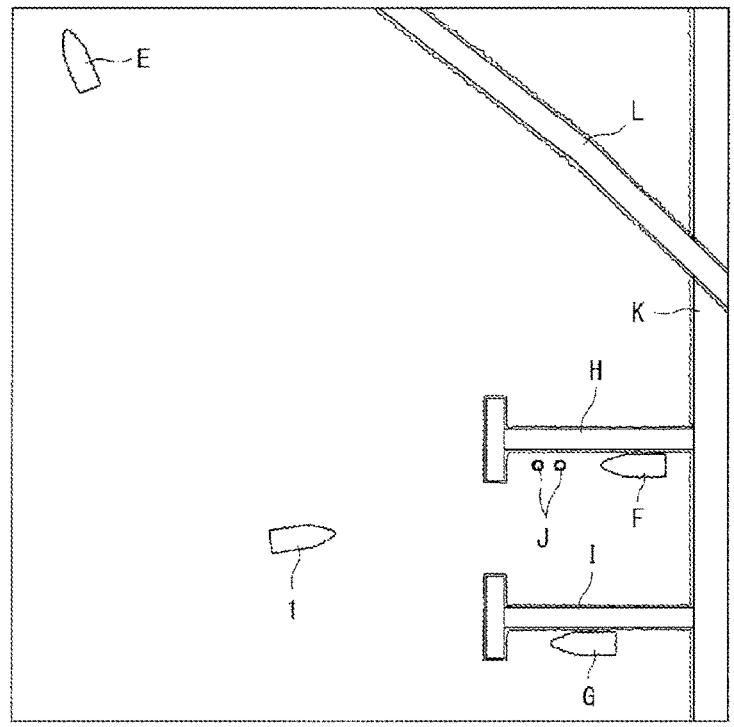
FIG. 11 is a diagram illustrating an example of a composite map with an aerial map superimposed in a modification example 2.

FIG. 11 illustrates an example of a composite map with an aerial map superimposed in the present modification example. By displaying an aerial map on the display 7 in a superimposed manner as described above, even if a composite map displayed on the display 7 is in an unclear state, immovable structures, buildings, and the like (structures, buildings, and the like present on an aerial map) can be clearly displayed on the composite map. Therefore, visibility of a map can be enhanced.

Modification Example 3

Next, a modification example 3 is described. The present modification example is also a modification example of a map display pattern on the display 7. Specifically, a target navigation trajectory (target movement trajectory) and actual navigation trajectory (actual movement trajectory) of the ship 1 are displayed on a composite map generated in the above-described embodiment or the modification example 1 in a superimposed manner.

For example, information on a target navigation trajectory is displayed on a composite map in a superimposed manner by reading a target navigation trajectory for a port associated with a composite map generated by a map generating operation at this time, from among target navigation trajectories for each of a plurality of ports stored in the database DB.

Further, information on an actual navigation trajectory is stored by causing the position estimation unit 5 to estimate a self-position of the ship 1 during navigation, and a change in the estimated self-position per unit time is plotted by a straight line to form an actual navigation trajectory, and the actual navigation trajectory is displayed on a composite map in a superimposed manner.

Figure 12:
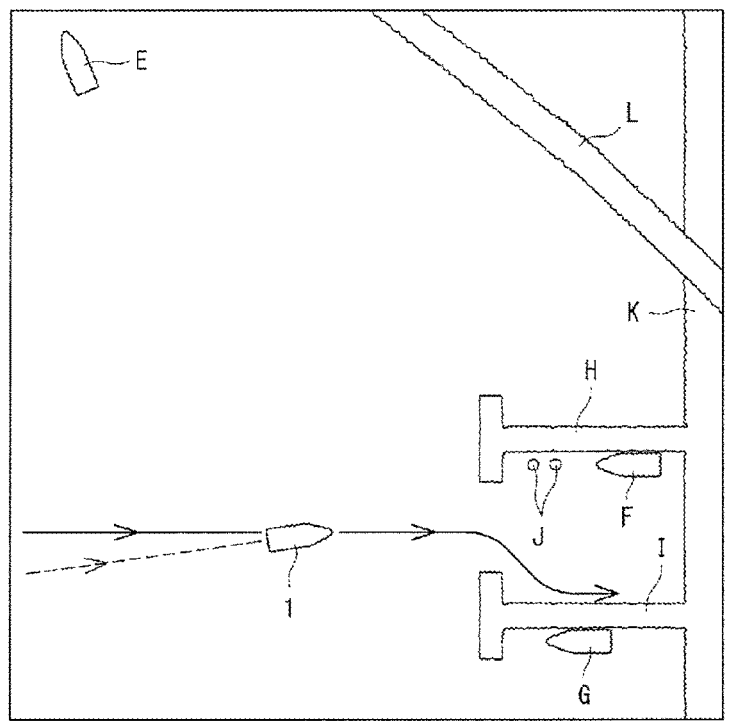
FIG. 12 is a diagram illustrating an example of a composite map with a target navigation trajectory and an actual navigation trajectory superimposed in a modification example 3.

FIG. 12 illustrates an example of a composite map with a target navigation trajectory (see the arrow indicated by solid lines in FIG. 12) and an actual navigation trajectory (see the arrow indicated by dashed lines in FIG. 12) superimposed in the present modification example. By displaying a target navigation trajectory and an actual navigation trajectory on the display 7 in a superimposed manner as described above, it is possible to confirm whether the ship 1 is properly navigating, and to expand the use of a composite map.

Modification Example 4

Next, a modification example 4 is described. The present modification example is an example in which, when generating a composite map, a misalignment of the composite map is recognized, and the misalignment is corrected.

In a case where a computation error when generating a composite map, an error in estimating a self-position of the ship 1, or the like has occurred, a misalignment may occur between a composite map and a proper map. In the present modification example, when a misalignment has occurred on a composite map, when an aerial map is superimposed on the composite map, as described in the modification example 2, positional correction of the composite map is performed by an amount of the misalignment.

Figure 13:
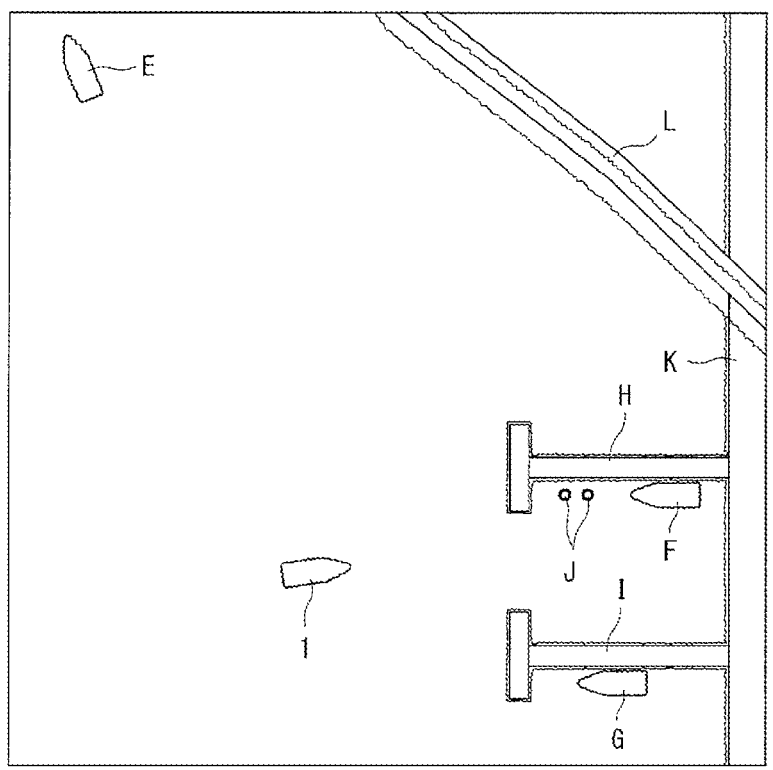
FIG. 13 is a diagram illustrating an example of a composite map describing map position correction, in a case where an aerial map is superimposed on a composite map in a modification example 4.

FIG. 13 illustrates a state in which a misalignment has occurred, in a case where an aerial map is superimposed on a composite map. FIG. 13 illustrates a state in which a misalignment has occurred in the bridge L on a generated composite map. An operation for eliminating the misalignment is described in the following.

Figure 14:
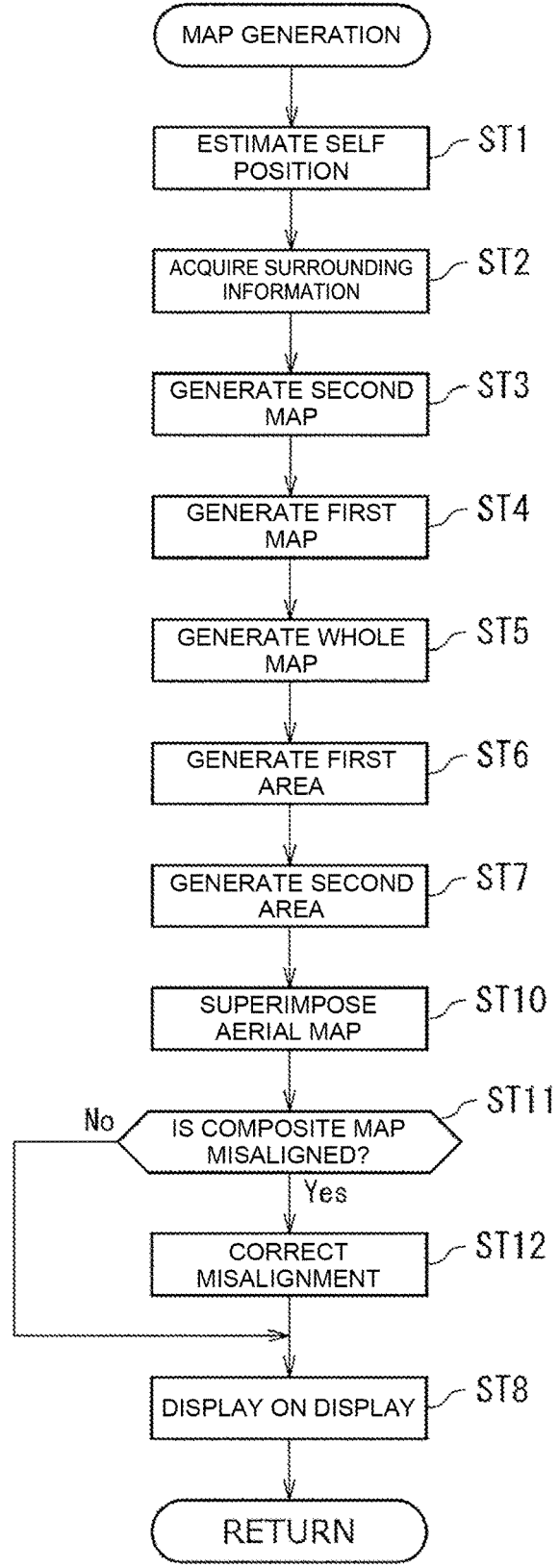
FIG. 14 is a diagram equivalent to FIG. 3 in the modification example 4.

FIG. 14 is a diagram equivalent to FIG. 3 (flowchart illustrating a map generation procedure) in the present modification example. Operations of steps ST1 to ST7 and ST8 are similar to those in the above-described embodiment. After a composite map is generated in step ST7, in step ST10, an aerial map is superimposed on the composite map. The aerial map is superimposed, based on objects and structures present in an area of a second map where high positional accuracy is acquired. For example, an aerial map is superimposed on a composite map in such a way that the piers H and I are aligned.

Then, in step ST11, the composite map is compared with the aerial map, and it is determined whether any misalignment has occurred in surrounding objects and structures by existing image processing.

When there is no misalignment in surrounding objects and structures, and a determination result in step ST11 is No, processing proceeds to step ST8 assuming that a composite map is generated properly, and the composite map is displayed on the display 7.

On the other hand, when there is a misalignment in surrounding objects and structures, and a determination result in step ST11 is Yes, processing proceeds to step ST12, and a correcting operation of the misalignment is performed. Specifically, an amount of the misalignment is computed, and the position of objects and structures on the composite map is corrected by the amount of misalignment. In the example illustrated in FIG. 13, only the position of the bridge L is corrected.

Thereafter, processing proceeds to step ST8, and a composite map after the correction is displayed on the display 7.

According to the present modification example, a more accurate composite map can be generated by the positional correction.

Modification Example 5

Next, a modification example 5 is described. In the above-described embodiment, a grid width of a wide area map is set as a fixed value according to a distance resolution of the radar 3. In other words, in a first map to be generated by information from the radar 3, a grid width is set by setting a depth in a quad tree to the depth 2. In the present modification example, a grid width of a first map is changed according to a distance to surrounding objects and structures, as well as a distance resolution of the radar 3.

Specifically, a depth in a quad tree in a first map to be generated by information from the radar 3 is selectively set as a depth 1 or the depth 2, and when a distance to a target object or structure is less than a predetermined distance (e.g. 500 m), a grid width of a first map in an area where the object or structure is present is set in such a way that a depth in a quad tree is the depth 2. In contrast, when a distance to the target object or structure is equal to more than the predetermined distance, a depth in a quad tree is set to the depth 1 in such a way that a grid width of the first map in the area where the object or structure is present becomes relatively wide.

In a first map where a high resolution is not required, a resolution of objects and structures at a long distance may be further lower than that of objects and structures at a short distance. For this reason, when a distance to surrounding objects and structures detected by the radar 3 is long, memory consumption can be suppressed while acquiring a minimum required resolution by setting a grid width in the associated area to be wide.

Other Embodiments

The present invention is not limited to the above-described embodiment and the above-described modification examples, and all modifications and applications encompassed within the scope of the claims and their equivalents are available.

For example, the above-described embodiment and the above-described modification examples have been described by way of an example in which a map to be used for automatic navigation and automatic berthing and unberthing of the ship 1 is generated. The present invention is not limited to the above, and can also be applied to a case where maps used for other purposes are generated. For example, the present invention is applicable to a case where a map to be used is generated when a construction machine or an agricultural machine automatically travels toward a work site, or moves to a predetermined position within a work site.

In addition, in the above-described embodiment and the above-described modification examples, the 3D-LIDAR 4 and the camera 8 are used as an EO sensor. The present invention may use a 2D-LIDAR in place of or in addition to these members.

Further, in the above-described embodiment and the above-described modification examples, the shape of a range surrounding the measurement point is a circle (measurement determination circle). The present invention is not limited to the above, and various shapes such as an ellipse, a triangle, and a square can be applied.

Further, the present invention is not limited to the above-described examples, regarding a depth in a quad tree when generating a first map and a second map, and a depth may be set deeper according to a size of a whole map or a required resolution. For example, a depth in a quad tree when generating a first map may be set to a depth 10, and a depth in a quad tree when generating a second map may be set to a depth 14.

Further, in the above-described embodiment and the above-described modification examples, when generating a composite map, a first map is combined with respect to a whole map, and then, a second map is combined. The present invention is not limited to the above, and a first map may be combined after a second map is combined with respect to a whole map. In this case, it is necessary to perform processing of preventing the second map from being overwritten by the first map.

Further, in the above-described embodiment and the above-described modification examples, a quad tree is used as a method of dividing a grid width for each area on a map. Alternatively, a composite map may be generated by using an octree, and recognizing surrounding objects and structures stereoscopically.

This application claims priority based on Japanese Patent Application No. 2020-042889 filed in Japan on Mar. 12, 2020, the entirety of which is hereby incorporated by reference thereto.

INDUSTRIAL APPLICABILITY

The present invention is applicable to a map generation method and a map generation device usable for automatic navigation and automatic berthing and unberthing of a ship.

DESCRIPTION OF REFERENCE NUMERALS

1 Ship (moving object)
2 Map generation device
3 Radar (first sensor, LD sensor)
4 LIDAR (second sensor, EO sensor)
6 Controller
61 Second map generation unit
62 First map generation unit
63 Whole map generation unit
64 First area generation unit
65 Second area generation unit
66 Composite map generation unit
8 Camera

The invention claimed is:

1. A map generation method in which a map is generated by using a first sensor configured to detect information on surrounding objects and terrain, and a second sensor configured to detect the surrounding objects and terrain in a narrow detection range and with a higher resolution as compared with the first sensor, the map generation method comprising:
   detecting, by the first sensor, information associated with surrounding objects and terrain;
   detecting, by the second sensor, the surrounding objects and the terrain;
   generating a first map based on a detection result of the first sensor;
   generating, based on a detection result of the second sensor, a second map having a predetermined grid width, wherein a grid width of the first map is wider than the predetermined grid width of the second map; and
   generating a composite map having the grid width of the first map and the predetermined grid width of the second map, wherein the composite map comprises a first area and a second area, wherein the first area and second area are set using tree structures, and wherein a depth of a tree structure for setting the second area on the composite map is deeper than a depth of a tree structure for setting the first area.

2. The map generation method according to claim 1, wherein generating the composite map includes:
   generating, on the composite map, the first area having the grid width of the first map according to the information on the surrounding objects and terrain of the first map, and
   generating, on the composite map, the second area having the predetermined grid width of the second map according to the information on the surrounding objects and terrain of the second map.

3. The map generation method according to claim 1, wherein the first sensor is a long distance sensor, and the second sensor is an electrical-optical sensor.

4. The map generation method according to claim 1, wherein the grid width of the first map and the predetermined grid width of the second map are each set as a fixed value according to a distance resolution of each of the first sensor and the second sensor.

5. The map generation method according to claim 1, wherein the second map is generated based on self-position estimation.

6. The map generation method according to claim 1, further comprising:
generating a third map having another predetermined grid width, the third map generated based on a camera configured to detect the surrounding objects and terrain in a narrow detection range and with a high resolution as compared with the first sensor, wherein
the second sensor is a light detection and ranging (LIDAR) sensor, and
the composite map further has the another predetermined grid width of the third map.

7. The map generation method according to claim 1, wherein, when the generated composite map is displayed on a display, an aerial map stored in advance is displayed as an area associated with the composite map in a superimposed manner.

8. The map generation method according to claim 1, wherein
the first sensor and the second sensor are mounted on a moving object, and
when the generated composite map is displayed on a display, at least one of a target movement trajectory and an actual movement trajectory of the moving object is displayed on the composite map on the display in a superimposed manner.

9. The map generation method according to claim 1, wherein
the first sensor and the second sensor are mounted on a moving object, and
when the generated composite map is compared with an aerial map stored in advance as an area associated with the composite map, and when there is a misalignment of an object and terrain on the composite map with respect to an associated object and terrain on the aerial map, position correction of the composite map is performed in a direction that eliminates the misalignment.

10. The map generation method according to claim 1, wherein
the composite map is used to control a propulsion and steering device mounted on a ship in such a way as to move the ship along a target movement trajectory during automatic navigation and automatic berthing and unberthing of the ship.

11. A map generation method in which a map is generated by using a first sensor configured to detect information on surrounding objects and terrain, and a second sensor configured to detect the surrounding objects and terrain in a narrow detection range and with a higher resolution as compared with the first sensor, the map generation method comprising:
detecting, by the first sensor, information associated with surrounding objects and terrain;
detecting, by the second sensor, the surrounding objects and the terrain;
generating a first map based on a detection result of the first sensor;
generating, based on a detection result of the second sensor, a second map having a predetermined grid width, wherein a grid width of the first map is wider than the predetermined grid width of the second map; and
generating a composite map having the grid width of the first map and the predetermined grid width of the second map, wherein the composite map comprises a first area and a second area, wherein the first area and second area are set using tree structures, and wherein a depth of a tree structure for setting the second area on the composite map is deeper than a depth of a tree structure for setting the first area, and
wherein the grid width of the first map in the composite map is based on an area where the objects and the terrain are located with a longer distance to surrounding objects and terrain detected by the first sensor.

12. A map generation device comprising:
a first sensor configured to detect information on surrounding objects and terrain;
a second sensor configured to detect the surrounding objects and terrain in a narrow detection range and with a higher resolution as compared with the first sensor;
a first map generation unit configured to generate a first map based on a detection result of the first sensor;
a second map generation unit configured to generate, based on a detection result of the second sensor, a second map having a predetermined grid width, the first map having a grid width wider than the predetermined grid width of the second map; and
a composite map generation unit configured to generate a composite map having the grid width of the first map and the predetermined grid width of the second map, wherein the composite map comprises a first area and a second area, wherein the first area and second area are set using tree structures, and wherein a depth of a tree structure for setting the second area on the composite map is deeper than a depth of a tree structure for setting the first area.

* * * * *